United States Patent
Donovan

(10) Patent No.: US 8,265,048 B1
(45) Date of Patent: *Sep. 11, 2012

(54) WIRELESS LOCAL AREA NETWORK AD-HOC MODE FOR REDUCING POWER CONSUMPTION

(75) Inventor: Timothy Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 165 days.

This patent is subject to a terminal disclaimer.

(21) Appl. No.: 12/269,413

(22) Filed: Nov. 12, 2008

Related U.S. Application Data

(63) Continuation of application No. 10/665,252, filed on Sep. 19, 2003, now Pat. No. 7,457,271.

(51) Int. Cl.
*H04W 4/00* (2009.01)

(52) U.S. Cl. ......... 370/338; 370/310; 370/328; 370/318

(58) Field of Classification Search ............... 370/310, 370/328, 338, 455, 444, 461–463, 447–451, 370/318, 561, 562, 550.1, 230, 260
See application file for complete search history.

(56) References Cited

U.S. PATENT DOCUMENTS

| | | | |
|---|---|---|---|
| 5,586,308 A | 12/1996 | Hawkins et al. | |
| 5,774,813 A | 6/1998 | Jokinen | |
| 5,844,435 A * | 12/1998 | Grundvig | 327/151 |
| 5,950,120 A | 9/1999 | Gardner et al. | |
| 6,011,383 A | 1/2000 | Dean et al. | |
| 6,178,332 B1 | 1/2001 | Norman et al. | |
| 6,282,661 B1 | 8/2001 | Nicol | |
| 6,523,128 B1 | 2/2003 | Stapleton et al. | |
| 6,704,584 B2 * | 3/2004 | Litwin | 455/574 |
| 6,873,215 B2 | 3/2005 | Devries et al. | |
| 7,046,977 B2 | 5/2006 | Khlat et al. | |
| 7,111,178 B2 | 9/2006 | Rusu et al. | |
| 7,508,781 B2 * | 3/2009 | Liu et al. | 370/311 |
| 2003/0044005 A1 | 3/2003 | Lee et al. | |
| 2004/0029620 A1 | 2/2004 | Karaoguz | |

(Continued)

FOREIGN PATENT DOCUMENTS
WO  WO 02/082248  10/2002

OTHER PUBLICATIONS
U.S. Appl. No. 10/650,887, entitled "Power Savings Apparatus and Method for Wireless Network Devices", filed Aug. 28, 2003; Timothy Donovan et al.; 40 pages.

(Continued)

*Primary Examiner* — Wayne Cai

(57) ABSTRACT

A system on chip (SOC) includes a media access control (MAC) device that controls transitions of a wireless local area network (LAN) station between an active mode and a low power mode. A first timing device generates a first clock signal based on timing signals from a crystal oscillator external to the SOC. A second timing device comprises a first oscillator. The first oscillator generates an oscillator signal and generates a second clock signal based on the oscillator signal. During the active mode, the MAC device powers up the first timing device causing a radio frequency (RF) transceiver external to the SOC to transmit data during a predetermined time slot that is assigned to the wireless LAN station and is not assigned to other wireless LAN stations in a LAN. During the low power mode, the MAC device powers down the first timing device and generates the second clock signal using the second timing device.

16 Claims, 5 Drawing Sheets

U.S. PATENT DOCUMENTS

2004/0029621 A1    2/2004   Karaoguz et al.
2004/0253996 A1*  12/2004   Chen et al. .................. 455/574
2006/0280140 A9*  12/2006   Mahany et al. ............... 370/329

OTHER PUBLICATIONS

IEEE Standard 802.11 (1999 Edition; 542 pages); IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications.

IEEE Standard 802.11a (1999 Edition; Amended 2000; 92 pages); Supplement to IEEE Standard for Information Technology; Telecommunications and Information Exchange Between Systems; Local and Metropolitan Area Networks; Specific Requirements; Part 11: Wireless LAN Medium Access Control (MAC and Physical Layer (PHY) Specifications; High-Speed Physical Layer in the 5 GHz Band.

IEEE Standard 802.11b (Sep. 16, 1999 Edition; 96 pages); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; High-Speed Physical Layer Extension in the 2.4 GHz Band.

IEEE Standard P802.11g, Draft Supplement to Standard for Information Technology-Telecommunications and Information Exchange Between Systems; Local and Metropolitan Area Networks—Specific Requirements; Part 11: Wireless LAN Medium Access Control (MAC) and Physical Layer (PHY) Specifications; Further Higher Data Rate Extension in the 2.4 GHz Band; Apr. 2003; pp. 1-69.

USPTO Non-Final Office Action mailed Sep. 20, 2007 for U.S. Appl. No. 10/665,252, filed Sep. 19, 2003.

Amendment filed Dec. 19, 2007 in response to USPTO Non-Final Office Action mailed Sep. 20, 2007 for U.S. Appl. No. 10/665,252, filed Sep. 19, 2003.

USPTO Final Office Action mailed Apr. 16, 2008 for U.S. Appl. No. 10/665,252, filed Sep. 19, 2003.

Amendment After Final filed Jun. 12, 2008 in response to USPTO Final Office Action mailed Apr. 16, 2008 for U.S. Appl. No. 10/665,252, filed Sep. 19, 2003.

* cited by examiner

WIRELESS LOCAL AREA NETWORK AD-HOC MODE FOR REDUCING POWER CONSUMPTION

CROSS-REFERENCE TO RELATED APPLICATIONS

This application is a continuation of U.S. patent application Ser. No. 10/665,252, filed on Sep. 19, 2003. The disclosure of the above application is incorporated herein by reference in its entirety.

FIELD OF THE INVENTION

The present invention relates to wireless networks, and more particularly to wireless networks operating in an ad-hoc mode.

BACKGROUND OF THE INVENTION

IEEE section 802.11, which is hereby incorporated by reference in its entirety, defines several different standards for configuring wireless Ethernet networks and devices. For example, 802.11 standards that have been popularized include 802.11, 802.11(a), 802.11(b) and 802.11(g). According to these standards, wireless Ethernet network devices may be operated in either an infrastructure mode or an ad-hoc mode. In the infrastructure mode, the wireless network devices communicate with each other through an access point. In the ad-hoc mode, the wireless network devices (which are typically called mobile stations) communicate directly with each other and do not employ an access point. The term mobile station may not necessarily mean that a wireless network device that is actually mobile. For example, a desktop computer may incorporate a wireless network device and operate as a mobile station in an ad-hoc network.

Referring now to FIG. 1, a wireless network 12 that is shown operates in an ad-hoc mode as defined by IEEE section 802.11 and other future wireless standards. The wireless network 12 includes multiple mobile stations 14-1, 14-2, and 14-3 that transmit and receive wireless signals 16 directly with each other to form an ad-hoc network. The mobile stations 14-1, 14-2, and 14-3 do not continuously exchange data.

Since the mobile stations are often battery powered, it is important to minimize power consumption to preserve battery life. Therefore, some wireless devices implement a low power mode and an active mode. During the active mode, the wireless device transmits and/or receives data. During the low power mode, the wireless device shuts down components and/or alters operation to conserve power. Usually, the wireless device is not able to transmit or receive data during the lower power mode.

Wireless Ethernet network devices may be implemented by a system on chip (SOC) circuit that includes a baseband processor (BBP), a medium access controller (MAC) device, a host interface, and one or more processors. A host communicates with the wireless network device via the host interface. The SOC circuit may include a radio frequency (RF) transceiver or the RF transceiver may be located externally. The host interface may include a peripheral component interface (PCI), although other types of interfaces may be used. The processor(s) may be Advanced RISC Machine (ARM) processor(s), although other types of processors may be used.

The MAC device controls and selects different operating modes of the BBP and the RF transceiver. During operation, the MAC device instructs the BBP and the RF transceiver to transition to a low power mode to conserve power. The BBP and RF transceivers may include phase-locked loops (PLL), which are calibrated using a reference signal that is supplied by a crystal oscillator (XOSC). The SOC may also include voltage regulators that provide regulated supply voltages to the system.

In an ad-hoc mode, the MAC device may instruct the BBP and the RF transceiver to transition to the low power mode when the mobile stations do not have data to exchange. Usually the voltage regulator in the BBP, the XOSC and PLL devices remain active and consume power during the low power mode.

In some conventional approaches, the operating voltage and/or the clock frequency are reduced during the low power mode while still allowing the system to operate at full capacity. In other conventional approaches, the way that functions are implemented is modified to reduce power consumption. For example, the device may lower a frequency of operation so that calculations take longer to complete.

In another approach, a wireless Ethernet network device has active and low power modes. A first voltage regulator regulates supply voltage during the active mode. A second voltage regulator dissipates less power than the first voltage regulator and regulates supply voltage during the low power mode. The MAC device selects the first voltage regulator during the active mode and the second voltage regulator during the low power mode. A crystal oscillator outputs a timing signal to the first PLL during the active mode. A first oscillator selectively generates a first clock signal during the low power mode. The first oscillator dissipates less power than the crystal oscillator.

In wireless networks, there are many reasons that make it difficult to stay in the low power mode for a period of time that is sufficient to significantly reduce average power consumption. For example in an ad-hoc network, each mobile station remains awake after each beacon for a duration of an Announcement Traffic Indication Map (ATIM) window. During the ATIM window, a first mobile station in the ad-hoc network may transmit a directed ATIM message to indicate that it has a message for a second mobile station. Other mobile stations likewise transmit directed ATIM messages if needed. In addition, there may be multicast ATIM messages that need to be sent during the ATIM period. Therefore, all of the mobile stations in the ad-hoc network remain awake during the ATIM window. When a mobile station receives a directed ATIM frame that is addressed to it or a multicast ATIM frame during the ATIM window, the mobile station remains awake for the entire beacon interval.

The relative timing of the directed and multicast ATIM messages during the ATIM window is typically determined using a backoff period. The mobile station counts down the backoff period and then transmits the respective ATIM message (if needed). A random number generator is typically used to generate the backoff period for each mobile station to reduce frame collisions. The use of random backoff periods lengthens the interframe space and increases the time that each mobile station must remain in receive mode. Similarly, a Distributed Coordination Function (DCF) is also implemented after the ATIM window to avoid collisions on the medium. The DCF also employs random backoff periods, which also increases the interframe space.

In some approaches, before the mobile station can enter the low power mode, the mobile station must exchange messages or frames with other mobile stations (hereinafter "power saving frame exchange"). The power saving frame exchange involves data transmission, which is the activity that consumes the most power. Therefore, the power saving frame exchange, which is used each time that the mobile stations enter the low power mode, further increases power consumption of the mobile stations.

In addition, at least one mobile station remains in the active mode between beacon intervals. This is due in part to the fact that at least one mobile station needs to maintain network time. In addition, mobile stations need to complete the power saving frame exchange sequence with another mobile station before going into the low power mode. The last mobile station that is awake does not have another mobile station to communicate with.

SUMMARY OF THE INVENTION

A wireless station according to the present invention communicates with at least one other wireless station in a local area network (LAN). A media access control (MAC) device controls transitions between an active mode and a low power mode. A radio frequency (RF) transceiver communicates with the MAC device and, after the transition to the active mode, transmits data during a predetermined time slot that is assigned to the wireless LAN station and that is not assigned to other wireless LAN stations in the LAN.

In other features, the RF transceiver receives data from other wireless LAN stations in the LAN during the active mode and transitions to the low power mode after receiving the data from the other wireless LAN stations. The MAC device transitions the wireless LAN station to the active mode prior to a timing beacon and transitions the wireless LAN station to the low power mode prior to a subsequent beacon.

In other features, after the transition to the active mode, the MAC device updates network time. The network time is set equal to a prior beacon time plus a beacon interval minus a fixed delay. After the fixed delay and a backoff period, the wireless LAN station transmits a beacon if the wireless LAN station has not already received a beacon. The wireless LAN station updates network time to match a time of the received beacon. The wireless LAN station transmits at least one frame following a short interframe space during the assigned time slot. The assigned time slot occurs one of after a prior time slot expires and after a wireless LAN station with the prior time slot transmits a null frame. A Distributed Coordination Function (DCF) interval is provided after a last one of the wireless LAN stations transmits data and before the wireless LAN stations transition to the low power mode.

In still other features, a first voltage regulator regulates supply voltage during the active mode and is powered down during the low power mode. A second voltage regulator dissipates less power than the first voltage regulator and regulates supply voltage during the low power mode. The MAC device selects the first voltage regulator during the active mode and the second voltage regulator during the low power mode. A baseband processor (BBP) performs radio frequency mixing and that communicates with the MAC device and the RF transceiver. A first phase locked loop (PLL) generates a first clock signal for the BBP during the active mode. A crystal oscillator outputs a timing signal to the first PLL during the active mode. The RF transceiver communicates with the BBP and includes a second PLL that receives the timing signal from the crystal oscillator during the active mode and that generates a second clock signal for the RF transceiver.

In still other features, a first oscillator generates a third clock signal during the low power mode. The first oscillator dissipates less power than the crystal oscillator. When the MAC device initiates the low power mode, at least one of the first voltage regulator, the RF transceiver, the first PLL, the second PLL and the crystal oscillator is shut down.

In still other features, the MAC device includes a counter. When the MAC device initiates the low power mode, the second voltage regulator powers the first oscillator and the counter. When the counter reaches a predetermined count, the MAC device powers up at least two of the crystal oscillator, the first voltage regulator, the RF transceiver, the first PLL and the second PLL.

In yet other features, the wireless LAN station is associated with a host that runs a multiplayer gaming application.

In still other features, a processor that communicates with the crystal oscillator calibrates the first oscillator using the timing signal from the crystal oscillator. At least two of the BBP, the first voltage regulator, the second voltage regulator, the RF transceiver, the MAC device, and the first PLL are implemented by a system on chip (SOC).

In yet other features, the wireless LAN station is otherwise compliant with at least one of IEEE section 802.11, 802.11 (a), 802.11(b), and 802.11(g). The LAN is an ad-hoc network. The wireless LAN stations are mobile stations in an ad-hoc network.

A wireless local area network (LAN) according to the present invention includes a first wireless LAN station that selectively operates in low power and active modes, that initiates a LAN, and that assigns predetermined time slots for transmitting data to wireless LAN stations joining the LAN. A second wireless LAN station selectively operates the low power and active modes, communicates with the first wireless LAN station, receives one of the predetermined time slots from the first wireless LAN station for transmitting data and, after transitioning to the active mode, transmits data during the one of the predetermined time slots.

In other features, the first wireless LAN station includes a first media access control (MAC) device that controls transitions between the active mode and the low power mode. A first radio frequency (RE) transceiver communicates with the first MAC device, transmits data for the first wireless LAN station during one of the predetermined time slots during the active mode, receives data from the other wireless LAN stations in the LAN during the active mode, and transitions to the low power mode after receiving the data from the other wireless LAN stations.

In other features, the second wireless LAN station includes a second media access control (MAC) device that controls transitions between the active mode and the low power mode. A second RF transceiver communicates with the second MAC device, transmits data for the second wireless LAN station during another of the assigned time slots during the active mode, receives data from the other wireless LAN stations in the LAN during the active mode, and transitions to the low power mode after receiving the data from the other wireless LAN stations.

In still other features, the first MAC device transitions the first wireless LAN station to the active mode prior to a timing beacon. The first MAC device transitions the first wireless LAN station to the low power mode prior to a subsequent beacon. After the transition to the active mode, the first MAC device updates network time. The network time is set equal to a prior beacon time plus a beacon interval minus a fixed delay. After the fixed delay and a backoff period, the first wireless LAN station transmits a beacon if the first wireless LAN station has not already received a beacon. The first wireless LAN station updates network time to match a time of the received beacon. The first wireless LAN station transmits at least one frame following a short interframe space during the assigned time slot.

In other features, the assigned time slot occurs one of after a prior time slot expires and after a wireless LAN station with the prior time slot transmits a null frame. A Distributed Coordination Function (DCF) interval is provided after a last one of the wireless LAN stations transmits data and before the transition to the low power mode.

In other features, the first and second wireless LAN stations are otherwise compliant with at least one of IEEE section 802.11, 802.11(a), 802.11(b), and 802.11(g). The first and second wireless LAN stations form an ad-hoc network. The first and second wireless LAN stations are mobile stations in an ad-hoc network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
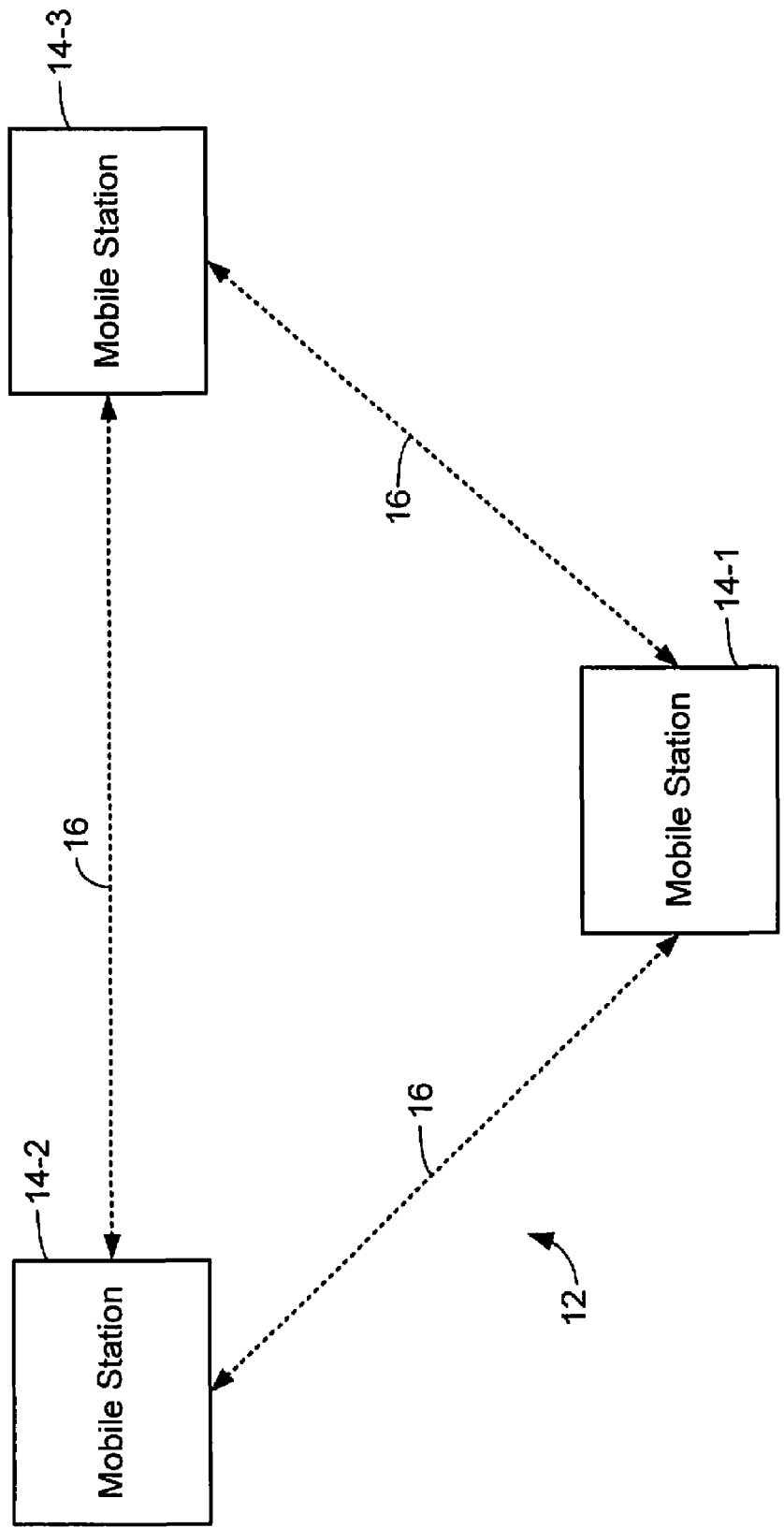
FIG. 1 illustrates a wireless network that is configured in an ad-hoc mode and that includes multiple mobile stations according to the prior art.

The following description of the preferred embodiment(s) is merely exemplary in nature and is in no way intended to limit the invention, its application, or uses. For purposes of clarity, the same reference numbers will be used in the drawings to identify similar elements.

To minimize power consumption, the wireless ad-hoc power savings mode according to the present invention allows all of the mobile stations to update each of the other mobile stations in a Basic Service Set (BSS) while minimizing the number of frame transitions that are required by each mobile station. Using the approach described below, the amount of time that each mobile station spends in the low power mode is significantly increased, which reduces the average power consumption of the mobile stations.

In some types of ad-hoc networks, all of the mobile stations need to transmit data regularly, for example, at each beacon interval. One example of this type of ad-hoc network is a wireless multi-player gaming application. Since all of the mobile stations in an ad-hoc network need to transmit and receive data at each beacon interval, the ATIM window is eliminated according to the present invention. This eliminates a wasteful period during which each mobile station needs to transmit a frame and all mobile stations stay in the receive mode to learn something that the mobile station already knows (that every other mobile station had data to transmit).

Since all mobile stations have data to transmit, a time slot approach that is similar to time division multiplexing (TDM) and that is described below is used to grant access to the wireless medium to mobile stations (instead of the DCF approach that is currently used). The time slot approach eliminates large idle times on the medium due to long interframe spacing and backoff times.

The mobile stations can enter the low power mode soon after each mobile station has transmitted its data. Power save frame exchanges are eliminated before the low power mode. This allows mobile stations to enter the low power mode sooner and with lower power consumption since the power save frame exchanges are no longer transmitted. In other words, it is assumed that all mobile stations will transition to the low power mode.

The wireless network devices according to the present invention preferably reduce power consumption using the low power saving approach that is set forth in "Power Savings Apparatus and Method For Wireless Network Devices", U.S. patent application Ser. No. 10/650,887, filed on Aug. 28, 2003, which is hereby incorporated by reference in its entirety. Skilled artisans will appreciate, however, that the wireless ad-hoc power saving approach according to the present invention may use any suitable power saving approach.

Figure 2:
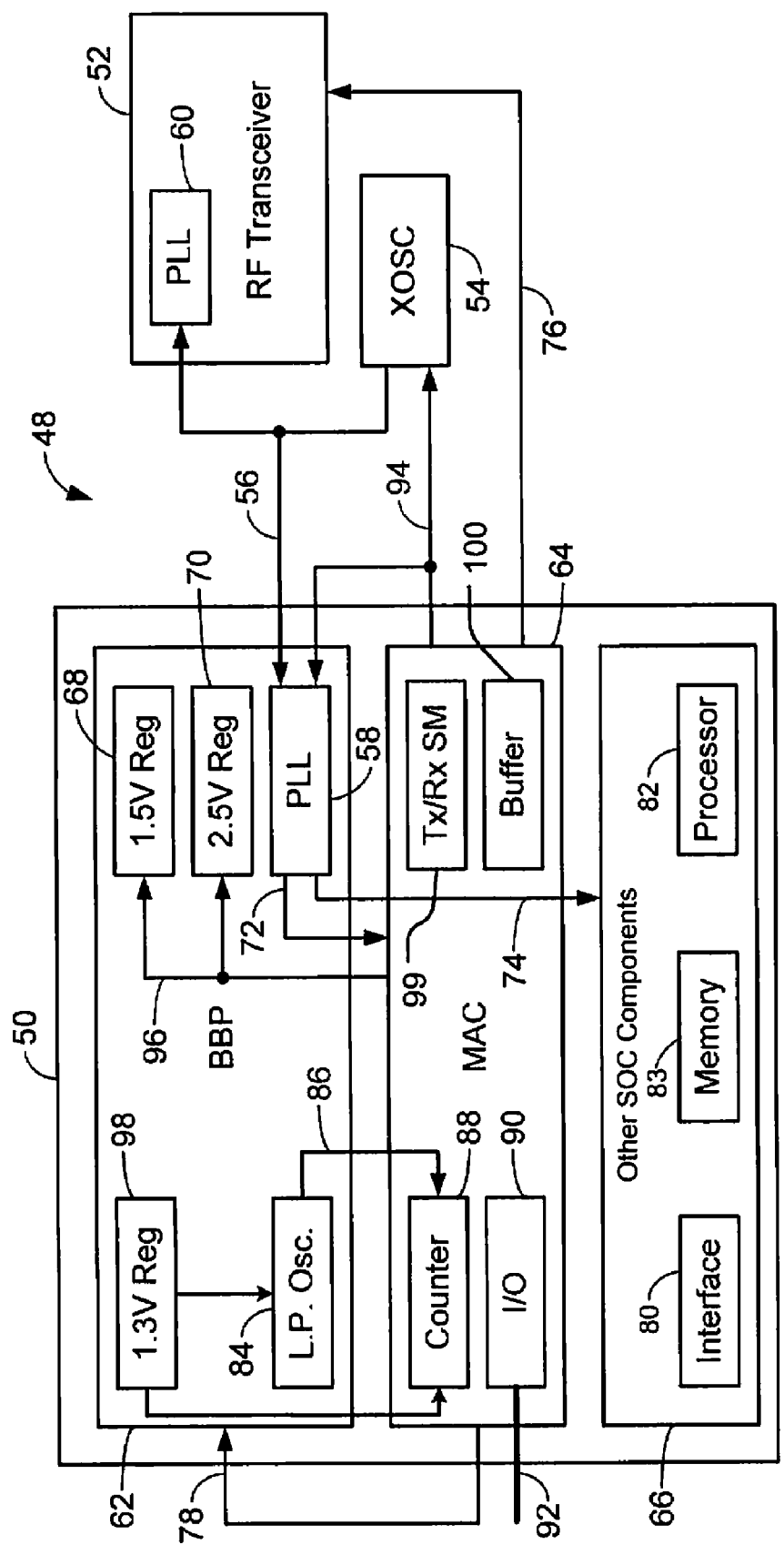
FIG. 2 is a functional block diagram of a wireless network communications device that implements a wireless ad-hoc power savings mode according to the present invention.

Referring now to FIG. 2, the wireless network communications device 48 in a mobile station operates in two power modes. In an active mode, the wireless network communications device 48 processes incoming and outgoing data. In the low power mode, the wireless network communications device 48 does not transmit or receive data. In one implementation, the wireless network communications device 48 includes an SOC circuit 50, an external radio frequency (RF) transceiver 52, and a crystal oscillator (XOSC) 54. The crystal oscillator 54 can be located externally or the amplifier portion of the crystal oscillator 54 can be integrated with the SOC circuit 50 and the crystal portion of the crystal oscillator 54 can be located externally.

The RF transceiver 52 wirelessly transmits/receives data to/from an AP or another mobile station. The XOSC 54 provides a reference signal 56 to first and second phase-locked loops (PLL) 58 and 60. The first PLL 58 is located in the SOC circuit 50 and the second PLL 60 is located in the RF transceiver 52. The first and second PLL 58 and 60 generate clock signals that are based on the reference signal 56 from the XOSC 54. For example, the XOSC 54 may provide a reference signal at a frequency of 44 MHz, although other frequencies may be used. The SOC and/or the RF transceiver may include multiple PLLs if desired to generate additional clock signals.

In one implementation, the SOC circuit 50 includes a baseband processor (BBP) 62, a medium access control (MAC) device 64, and other SOC components 66. The BBP 62 includes a digital voltage regulator 68, an analog voltage regulator 70, and the first PLL 58. The digital and analog voltage regulators 68 and 70, respectively, supply regulated voltages to one or more components in the SOC circuit 50. For example, the digital voltage regulator 68 may operate at 1.5V and the analog voltage regulator 70 may operate at 2.5V. Additional analog and/or digital voltage regulators and/or voltage regulators operating at other voltages may be employed. The first PLL 58 generates one or more clock signals 72 for the MAC device 64, one or more clock 74 for the other SOC components 66 and one or more clock signals for the BBP 62 based on the reference signal 56 from the XOSC 54.

The MAC device 64 transmits a transceiver mode signal 76 to the RF transceiver 52. The transceiver mode signal 76 instructs the RF transceiver 52 to operate in the active mode or the low power mode. The transceiver mode signal 76 also informs the RF transceiver 52 whether it is transmitting or receiving RF signals during the active mode. The RF transceiver 52 remains deactivated during the low power mode and does not transmit or receive RF signals. Preferably, the RF transceiver 52 is completely shut down for maximum power reduction. However, during the low power mode, the RF transceiver 52 may utilize a small amount of power to ensure a quick transition from the low power mode to the active mode.

The MAC device 64 also transmits a BBP mode signal 78 to the BBP 62. The BBP mode signal 78 instructs the BBP 62 to operate in the active mode or the low power mode. The other SOC components 66 include a host interface 80, a processor 82 and memory 83. The host interface 80 provides an interface such as peripheral component interconnect (PCI) interface or other suitable interfaces. The host interface may be connected to a host. The processor 82 may be an Advanced RISC Machine (ARM) processor and/or any other processor. The memory 83 stores data.

The duration that the wireless network communications device 48 operates in the low power mode varies. The start time is variable and the end time is fixed (in other words, the low power mode ends before the start of the next beacon). If the wireless network communications device 48 is not triggered during the low power mode, it returns to the active mode before the start of the next beacon. The XOSC 54 consumes a significant amount of power during the active mode. For example, the XOSC 54 may consume 10-12 mA of current. Therefore, the MAC device 64 deactivates the XOSC 54 during the low power mode.

The BBP 62 includes a low power oscillator 84 that provides a signal 86 to a counter 88 in the MAC device 64. For example, the low power oscillator 84 may be implemented either internally (as shown) or externally and may operate at a frequency of 100 kHz. The counter 88 determines when the wireless network communications device 48 wakes from the low power mode prior to a beacon interval. The low power oscillator 84 is typically susceptible to performance deviations due to temperature variances. Therefore, before the wireless network communications device 48 enters the low power mode, the processor 82 optionally calibrates the low power oscillator 84 using the XOSC 54 to ensure that the low power oscillator 84 accurately tracks the desired low power time period. The calibration may be performed every time that the low power mode occurs, periodically, randomly, on an event basis or using any other criteria. Alternately, the MAC, the BBP and/or any other suitable system component can perform the calibration of the low power oscillator.

For example, the processor 82 may measure the difference between the frequency of the low power oscillator 84 and the frequency of the XOSC 54. Based on the frequency difference, the processor 82 determines the number of times that the counter 88 must increment or decrement to equal a desired period. The XOSC 54 can also calibrate the low power oscillator 84 on a periodic basis.

The MAC device 64 includes an input/output (I/O) module 90, which may be located outside of the MAC in the SOC circuit 50. For example, the I/O module 90 may be a general purpose I/O module (GPIO). In the event that a mobile station requires the wireless network communications device 48 to return to the active mode, the mobile station triggers an I/O input 92. If the I/O input 92 is triggered during the low power mode, the wireless network communications device 48 returns to the active mode. Some host interfaces such as a compact flash card may not include a signal to trigger the I/O module. In that case, the processor 82 generates an interrupt when the wireless network communications device 48 returns to the active mode. The interrupt queries the host to determine whether the host has data to transmit.

Before entering the low power mode, the processor 82 optionally calibrates the low power oscillator 84 using signals generated by the XOSC 54. The MAC device 64 instructs the BBP 62, the RF transceiver 52 and the PLL 60 to enter the low power mode. The MAC device 64 disables internal clocks in the SOC circuit 50. The MAC device 64 next disables the first PLL 58, then the XOSC 54 and voltage regulators 68 and 70 with a disable signal 94.

Since the MAC device 64 disables the digital voltage regulator 68 during the low power mode, the BBP 62 includes a low power digital voltage regulator 98. The low power voltage regulator 98 dissipates less power than the other voltage regulators. For example, the voltage regulator 98 may operate at 1.3 V and with a lower current level than the other regulators. The low power voltage regulator 98 provides power for the low power oscillator 84 and the counter during the low power mode. The low power voltage regulator 98 also supplies power to registers and memories in the SOC circuit 50 so that the state of the SOC circuits 50 is retained, which is important for fast wake up time. The MAC device also includes transmit and receive state machines 99 and a transmit buffer 100.

During the low power mode, the I/O module 90 monitors the I/O input 92. If the I/O input 92 is not triggered during the low power mode, the wireless network communications device 48 returns to the high power mode after the counter 88 reaches the end of the low power period. In order to return to the active mode, the MAC device 64 enables the voltage regulators 68 and 70 and the XOSC 54, respectively. The MAC device 64 activates the first PLL 58. The MAC device next enables the internal clocks 72 and 74. Finally, the MAC device 64 instructs the BBP 62 and the RF transceiver 52 to operate in the active mode.

Figure 3:
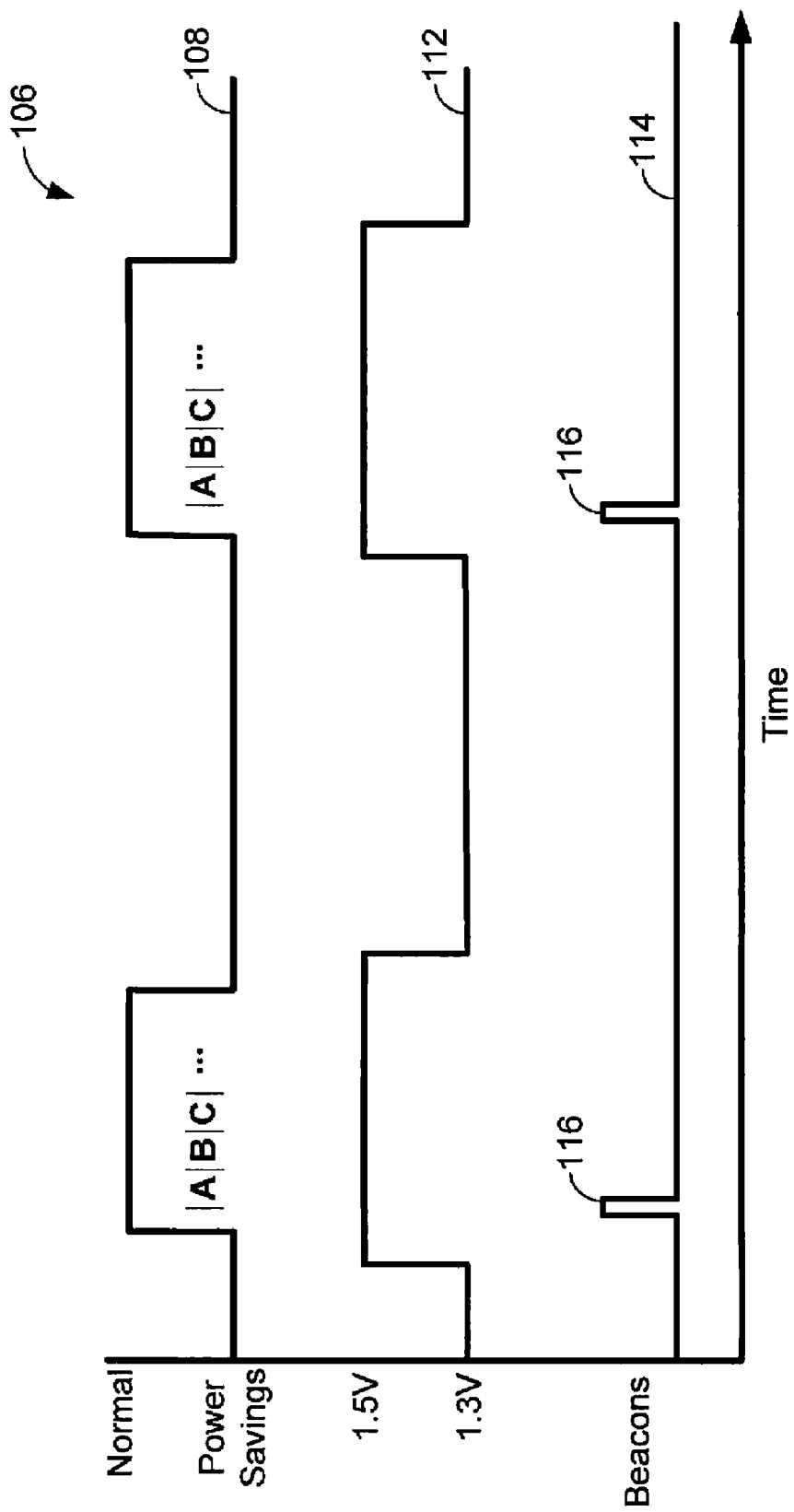
FIG. 3 is a timing diagram that illustrates operating modes and supply voltage levels.

Referring now to FIG. 3, an exemplary timing diagram 106 according to the present invention is illustrated. A chipset mode signal 108 identifies the active mode and the low power mode. A supply voltage signal 112 indicates the voltage level that is supplied by either the digital voltage regulator 68 or the low power digital voltage regulator 98. The supply voltage signal 112 illustrates the supply voltage fluctuation between 1.3 V to 1.5 V prior to the wireless network communications device 48 returning to the normal mode. As can be appreciated, other higher and/or lower voltage levels may be used (such as but not limited to 1.1V and 1.3 V). This ensures that the digital voltage regulator 68 supplies a sufficient amount of power to devices such as the BBP 62 when the devices return from the low power mode. Additionally, the supply voltage decreases from 1.5 V to 1.3 V shortly after the wireless network communications device 48 enters the low power mode. This ensures that the SOC circuit 50 receives sufficient power and avoids overloading before devices such as the BBP 62 are completely deactivated.

A beacon transmission signal 114 illustrates an exemplary beacon transmission pattern. Preferably, the wireless network communications device 48 returns to the active mode just prior to a beacon transmission.

Figure 4:
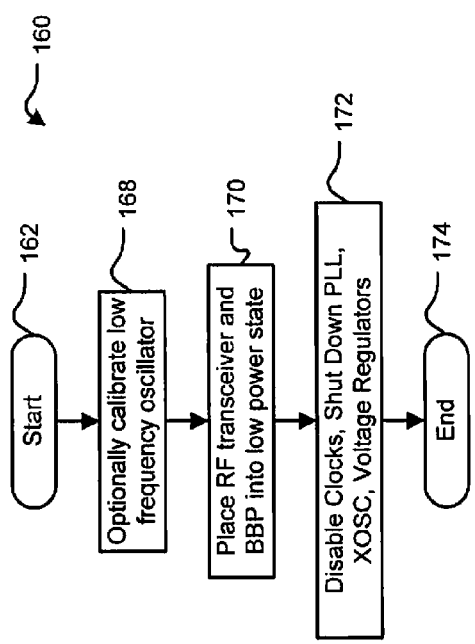
FIG. 4 is a flowchart illustrating steps performed by the wireless network communications device to enter the wireless ad-hoc power savings mode according to the present invention.

Referring now to FIG. 4, an ad-hoc mode shutdown algorithm 160 begins in step 162. In step 168, the processor 82 optionally calibrates the low power oscillator 84 using signals generated by the XOSC 54. In step 170, the RF transceiver and the BBP are transitioned to the low power state or mode. In step 172, the internal clocks are disabled and the PLLs, the XOSC and the voltage regulators are shut down. Control ends in step 174.

Figure 5A:
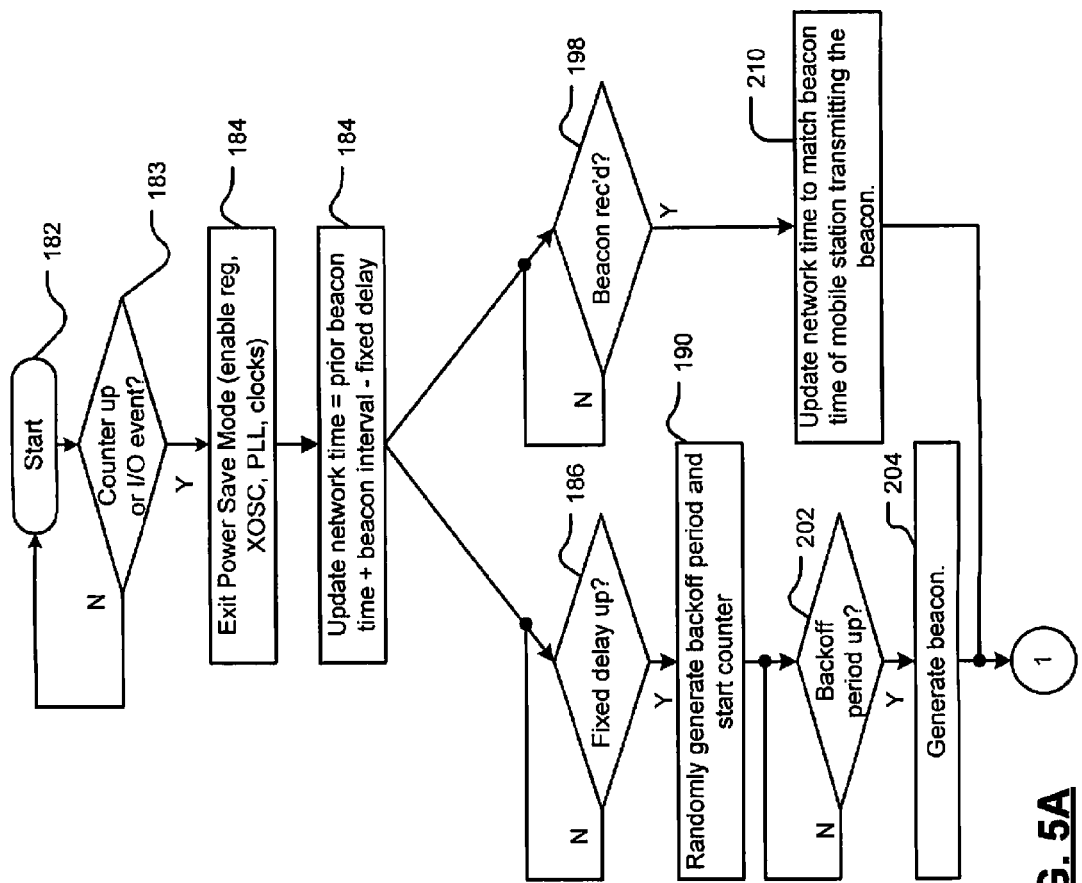
FIGS. 5A and 5B are flowcharts illustrating steps performed by the wireless network communications device to exit the wireless ad-hoc power savings mode according to the present invention.
Figure 5B:
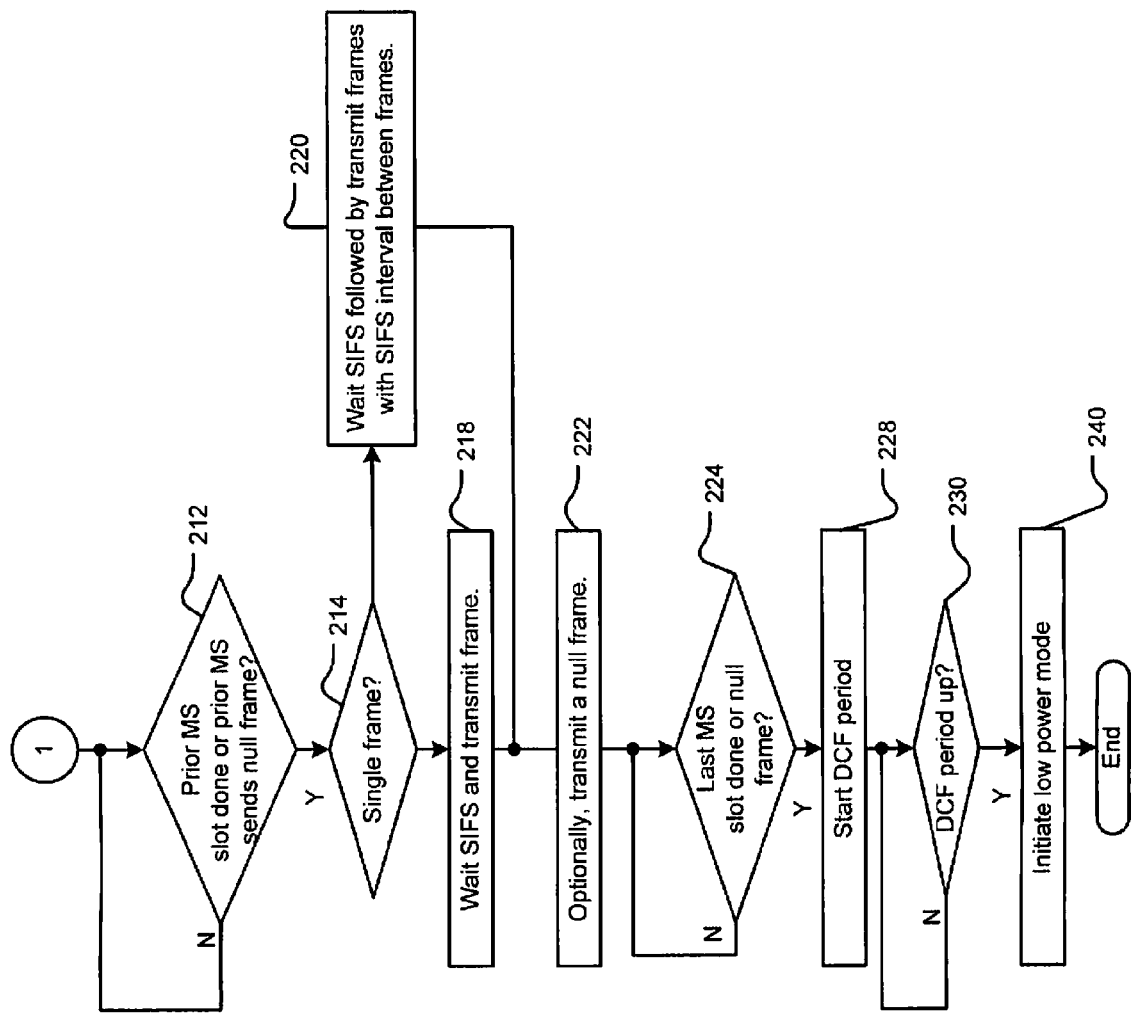

Referring now to FIGS. 5A and 5B, steps that are performed by each mobile station to implement the new wireless ad-hoc mode will now be described, starting at a point in time when all mobile stations are in sleep mode. Upon entering sleep mode, all mobile stations time the duration of the sleep interval in order to wakeup and stabilize all circuitry prior to the next scheduled beacon. Preferably, this is done with a low frequency oscillator that is described above in order to reduce current consumption. In step 183, if the counter is up and the wakeup time has arrived, the remaining circuitry is enabled in step 184. Once all of the circuitry has stabilized, the network time in each mobile station is updated to the previous beacon time plus the beacon interval time minus some fixed delay in step 186.

Once a mobile station has returned to the active state, it will be put into receive mode, and will wait for a beacon to be received in step 198. In parallel with this, each mobile station will attempt to transmit a beacon, beginning by waiting for the fixed delay to end in step 186. These parallel processes will continue until either a beacon is received from another mobile station or transmitted by the mobile station, at which time data transfer will begin in step 212

At the end of the fixed delay as determined in step 190, each mobile station will attempt to transmit a beacon using the standard random backoff algorithm. To that end, the random backoff period is generated and a backoff counter is started in step 194. In step 202, control determines whether the backoff period is up. If true, the mobile station generates a beacon in step 204.

All mobile stations receiving a beacon update their network time to match that of the mobile station transmitting the beacon in step 210. Once a beacon has been transmitted, each mobile station will be given a slot of time to transmit its data using multicast frames to all other mobile stations. If more than one frame needs to be transmitted, a SIFS interval will be used between frames. The sequence will proceed with mobile station A followed by mobile station B followed by mobile station C (for example, see FIG. 3), until all mobile stations have transmitted. Mobile station B will be allowed to transmit at the earlier of the end of mobile station A's slot time or after receiving a null data frame from mobile station A. Mobile station B will use a SIFS interval before transmitting. Each mobile station may optionally transmit each frame multiple times.

In step 212, control determines whether the slot assigned to the prior mobile station is over or whether the prior mobile station sent a null frame. In step 214, control determines whether the current mobile station has a single frame to send. If true, the frame is transmitted after a short interframe space (SIFS) in step 218. If false, multiple frames are transmitted after a SIFS interval, with a SIFS interval between each pair of adjacent frames in step 220. In step 222, control optionally transmits a null packet to prematurely end that mobile stations slot time. In step 224, control determines whether the last mobile station slot is done or whether the last mobile station sends a null frame. If true, the mobile stations start the DCF period in step 228. When the DCF period is up in step 230, the mobile station initiates the low power mode in step 240 (as shown in FIG. 4).

The designation of mobile stations as mobile station A, mobile station B, etc. can be made in any suitable fashion. One approach assigns the mobile station that initiated the BSS to be mobile station A. The next mobile station that joins the BSS is designated mobile station B, etc.

When the time slot for the last mobile station in the sequence has ended or the last mobile station in the sequence has transmitted a null frame, a DCF interval (having a programmable length) is provided to allow the network to operate in the DCF mode. The DCF interval allows new mobile stations to join the network and allows for other management and control frames to be sent. The DCF interval can be used to inform existing mobile stations in the network that a mobile station has joined or left the BSS. As can be appreciated, the DCF interval can also be used to distribute other information as well. At the end of the DCF interval, all mobile stations can enter the sleep state without informing other mobile stations.

Occasionally, there may be situations when a mobile station does not receive data from one of the other mobile stations. During the DCF interval, a mobile station can optionally send messages that request another mobile station to raise its power level.

In gaming implementations, there may be situations when non-gaming traffic occurs such as when a new mobile station wants to join BSS and/or a module station sends messages relating to starting a game over. In these situations, each mobile station can send multiple frames up to a maximum time limit. Initially management frames can be sent followed by data frames. A data null frame can be used to end a time slot early. Alternately, the DCF interval can be used. When a mobile station leaves the network (without informing other stations), the mobile station that initiated the BSS can send a message during the DCF interval that reassigns the slots and takes away the slot from a mobile station that is no longer transmitting.

As can be appreciated, while the present invention has been described in conjunction with ad-hoc networks, skilled artisans will appreciate that the present invention also applies to wireless infrastructure networks as well. In addition, while the wireless network devices are implemented by an SOC, any other suitable approach can be used including but not limited to Application Specific Integrated Circuits (ASICs), controllers, processors and memory running firmware and/or software, combinatorial logic, discrete circuits and/or combinations thereof.

While the foregoing description described the use of a null frame to prematurely end a time slot, skilled artisans will appreciate that there are other ways of ending a frame prematurely. For example, specific information can be inserted in the MAC header to identify the final frame of the current time slot.

For example, every data frame has a MAC header that includes a sequence number. In one implementation, a predetermined sequence number (for example, sequence number 0 or other sequence numbers) is used to designate the end the time slot. Every data frame has a MAC header that also includes a duration value. A predetermined duration value can be used to end the time slot (for example, duration number 0 or other duration numbers can be used).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A system on chip (SOC), comprising:
 a media access control (MAC) device configured to control transitions of a wireless local area network (LAN) station between an active mode and a low power mode;
 a first timing device configured to generate a first clock signal based on timing signals from a crystal oscillator external to the SOC; and
 a second timing device that comprises a first oscillator, wherein the first oscillator is configured to generate an oscillator signal,
 wherein, during the active mode, the MAC device is configured to
  power up the first timing device, and
  cause a radio frequency (RF) transceiver external to the SOC to transmit data during a predetermined time slot (i) that is assigned to the wireless LAN station and (ii) that is not assigned to other wireless LAN stations in a LAN, and
 wherein, during the low power mode, the MAC device is configured to
  power down the first timing device, and
  cause the second timing device to generate the oscillator signal using the first oscillator, and
 wherein the MAC device is configured to i) transition the wireless LAN station to the active mode prior to a timing beacon, ii) maintain the active mode until after predetermined time slots of each of the wireless LAN stations in the LAN, and iii) transition the wireless LAN station to the low power mode a predetermined time after the predetermined time slots of each of the wireless LAN stations in the LAN.

2. The SOC of claim 1, further comprising a baseband processor (BBP) configured to i) perform radio frequency mixing, and ii) communicate with the MAC device and the RF transceiver, wherein the BBP includes the first timing device.

3. The SOC of claim 2, wherein the first timing device includes a first phase locked loop (PLL), the first PLL being configured to generate the first clock signal based on the timing signal from the crystal oscillator.

4. A system comprising the SOC of claim 3, the system further comprising:
 the RF transceiver,
 wherein the RF transceiver includes a second PLL, the second PLL being configured to receive the timing signal from the crystal oscillator.

5. The system of claim 4, further comprising:
 a first digital voltage regulator configured to regulate digital supply voltage during the active mode, the first digital voltage regulator being powered down during the low power mode; and
 a second digital voltage regulator configured to i) dissipate less power than the first digital voltage regulator and ii) regulate digital supply voltage during the low power mode,
 wherein the MAC device is configured to i) select the first digital voltage regulator during the active mode, and ii) select the second digital voltage regulator during the low power mode.

6. The system of claim 5, wherein when the MAC device initiates the low power mode, the MAC device is configured to power down each of the first digital voltage regulator, the RF transceiver, the first PLL, the second PLL, and the crystal oscillator.

7. The system of claim 5, wherein the second timing device includes a counter, and wherein when the counter reaches a predetermined count during the low power mode, the MAC device is configured to power up each of the crystal oscillator, the first digital voltage regulator, the RF transceiver, the first PLL, and the second PLL.

8. The SOC of claim 1, wherein after the transition to the active mode, the MAC device is configured to update network time.

9. The SOC of claim 8, wherein the network time is set equal to a prior beacon time plus a beacon interval minus a fixed delay.

10. The SOC of claim 9, wherein after the fixed delay and a backoff period, the wireless LAN station is configured to transmit a beacon if the wireless LAN station has not already received a beacon.

11. The SOC of claim 10, wherein the wireless LAN station is configured to update network time to match a time of the transmitted beacon.

12. The SOC of claim 1, wherein the wireless LAN station is configured to transmit at least one frame following a short interframe space during the predetermined time slot.

13. The SOC of claim 1, wherein the predetermined time slot occurs after a wireless LAN station assigned to the prior time slot transmits a null frame.

14. The SOC of claim 1, wherein the predetermined time slot occurs after a wireless LAN station assigned to the prior time slot transmits a frame having a predetermined sequence number.

15. The SOC of claim 1, wherein the predetermined time slot occurs after a wireless LAN station assigned to the prior time slot transmits a frame having a predetermined duration value.

16. The SOC of claim 1, further comprising a processor, wherein the processor is configured to calibrate the first oscillator using the timing signal from the crystal oscillator during the active mode.

* * * * *